(12) United States Patent
Muska et al.

(10) Patent No.: US 7,088,599 B1
(45) Date of Patent: Aug. 8, 2006

(54) DUAL-MODE CONVERTER WITH LINEAR AND COMPARATIVE FEEDBACK MODES

(75) Inventors: Michael J. Muska, Langhorne, PA (US); Dominick F. Travaglini, Doylestown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/108,714

(22) Filed: Apr. 19, 2005

Related U.S. Application Data

(60) Provisional application No. 60/563,459, filed on Apr. 20, 2004.

(51) Int. Cl.
*H02M 3/335* (2006.01)
(52) U.S. Cl. ............................. 363/21.01; 363/21.11; 363/21.18; 363/97
(58) Field of Classification Search .............. 363/21.01, 363/21.04, 21.09, 21.1, 21.11, 21.12, 21.17, 363/21.18, 97, 131
See application file for complete search history.

(56) References Cited

U.S. PATENT DOCUMENTS

| | | | | |
|---|---|---|---|---|
| 6,157,549 A | * | 12/2000 | Nath | 348/730 |
| 6,356,466 B1 | * | 3/2002 | Smidt et al. | 363/21.17 |
| 6,714,425 B1 | * | 3/2004 | Yamada et al. | 363/21.12 |
| 6,999,324 B1 | * | 2/2006 | Feldtkeller | 363/19 |
| 7,019,995 B1 | * | 3/2006 | Niemand et al. | 363/97 |

* cited by examiner

*Primary Examiner*—Gary L Laxton
(74) *Attorney, Agent, or Firm*—McDermott Will & Emery LLP

(57) ABSTRACT

A dual-mode converter for converting power from an input voltage level to an output voltage level, the dual-mode converter including an inductor section having an input side and an output side, the input side receiving an input signal and the output side outputting at least one output signal based on a power value of the input signal, a feedback loop section which receives a feedback signal from one or more of the at least one output signals, the feedback loop section including a first transistor, a second transistor and a comparator unit which outputs a comparator output signal based on a comparison of the feedback signal to a comparator reference signal, wherein the respective states of the first and second transistors configure the feedback loop section to function as either a linear mode or a comparator mode, a current mode controller unit which receives the input signal, the feedback signal, and a current sense signal representing a sensed current flowing through the input side of the inductor section, the current mode controller unit outputting an output control signal based on the received input signal, the feedback signal, and the current sense signal, and a control gate that enables the current flow through the input side of the inductor section when either the output control signal or the comparator output signal is greater than a predetermined threshold.

13 Claims, 3 Drawing Sheets

DUAL-MODE CONVERTER WITH LINEAR AND COMPARATIVE FEEDBACK MODES

CROSS-REFERENCE TO RELATED APPLICATIONS

This application claims priority to U.S. Provisional Patent Application No. 60/563,459, filed Apr. 20, 2004, entitled "LINCOMP CONVERTER," which is incorporated by reference herein for all purposes.

STATEMENT AS TO RIGHTS TO INVENTIONS MADE UNDER FEDERALLY SPONSORED RESEARCH OR DEVELOPMENT

Not applicable to this invention.

BACKGROUND OF THE INVENTION

1. Field of the Invention

The invention is generally directed to a dual mode converter which converts power and which has a feedback loop that operates in a linear mode during continuous input loads and which operates in a comparative modes during a step input load.

2. Description of the Related Art

In the field of electric circuits, converters are used in many applications such as power conversion in which the voltage level from a power source is decreased to a desired voltage. In many applications using conventional converters, linearity errors can cause distortion, which limits the performance of the system that relies on the converter. For example, such distortion can decrease the operational bandwidth of the system which uses the converter.

In addition, many conventional converters use linear feedback which does not perform as well for step input loads as it does for continuous input loads. Such converters often result in overshoot or undershoot output voltage in response to a discontinuous step load. Many converters that are used to work with discontinuous step loads have slow transient response. Also, many conventional converters require feedback loop compensation because such converters are inherently unstable. The use of feedback loop compensation adds additional complexity and cost to the converter, and often requires adjustment of the compensation parameters when the converter is implemented into a specific application, thereby requiring additional setup time.

Converters are used in many applications in which the converter must work well with both continuous loads and non-continuous step loads. These applications, such as require converters that operate in a high performance mode for both continuous and discontinuous loads.

Accordingly, it is desirable invent a converter that can operate in a high performance mode for both continuous and discontinuous loads, that is inherently stable, and that uses fewer and less complex components, thereby reducing size and cost.

SUMMARY OF THE INVENTION

This present invention solves the foregoing problems by providing a dual mode converter that converts power and that uses a feedback loop that operates in a linear mode during continuous input loads and that operates in a comparative mode during a step input load, with inherent stability.

Specifically, according to one aspect of the invention, a dual-mode converter is provided for converting power from an input voltage level to an output voltage level. The dual-mode converter includes an inductor section having an input side and an output side, the input side receiving an input signal and the output side outputting at least one output signal based on a power value of the input signal, a feedback loop section which receives a feedback signal from one or more of the at least one output signals, the feedback loop section including a first transistor, a second transistor and a comparator unit which outputs a comparator output signal based on a comparison of the feedback signal to a comparator reference signal, wherein the respective states of the first and second transistors configure the feedback loop section to function in either a linear mode or a comparator mode, a current mode controller unit which receives the input signal, the feedback signal, and a current sense signal representing a sensed current flowing through the input side of the inductor section, the current mode controller unit outputting an output control signal based on the received input signal, the feedback signal, and the current sense signal, and a control gate that enables the current flow through the input side of the inductor section when either the output control signal or the comparator output signal is greater than a predetermined threshold.

Preferably, the input side of the inductor section includes a single primary inductor and the output side includes multiple secondary inductors, each of which outputs a corresponding output signal. Also, when the input signal has a continuous voltage value, the first transistor is in an on-state and the second transistor is in an off-state, the feedback loop section is configured to operate in a linear mode by connecting the feedback signal with the current sense signal that is input to the current controller unit, and by connecting the feedback signal to the comparator unit. Similarly, when the input signal represents a step load having a non-continuous voltage value, the first transistor is in an off-state and the second transistor is in an on-state, thereby configuring the feedback loop section to operate in a comparator mode by disconnecting the feedback signal from the current sense signal, and by disconnecting the feedback signal from the comparator unit so that the comparator unit does not output the comparator output signal.

In this manner, the present invention provides a converter having a feedback loop that operates with high performance in a linear mode during continuous input loads and that operates in a comparative mode during a step input load, with inherent stability. Accordingly, the converter of the present invention provides increased performance without the need for feedback loop compensation or other complex components.

The invention will be better understood upon reference to the following detailed description in connection with the accompanying drawings and appended claims.

DETAILED DESCRIPTION

Figure 1:
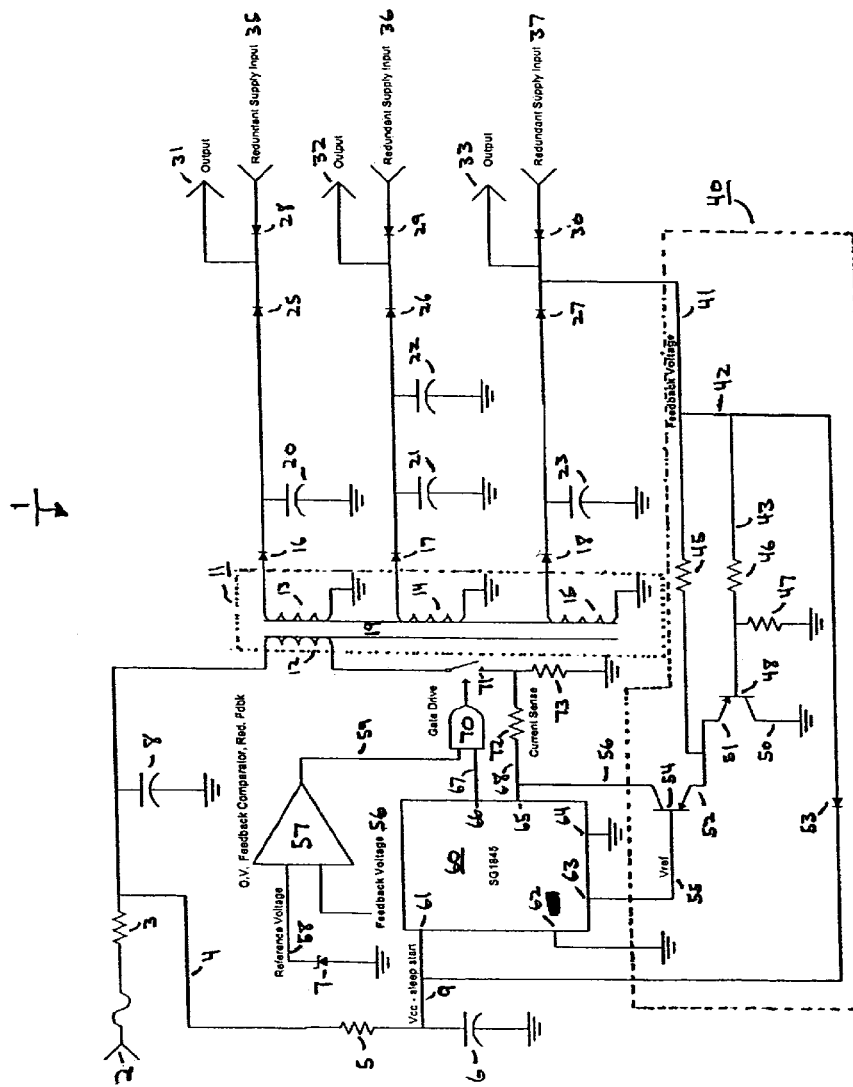
FIG. 1 shows a schematic for a converter according to one embodiment of the present invention.

FIG. 1 shows a schematic of a converter according to one embodiment of the present invention. As seen in FIG. 1, converter 1 includes many common circuit components and is configured to provide a controlled dual-mode converter with a feedback loop that operates in a linear mode under continuous loads, and that operates in a comparative mode under non-continuous step loads.

Converter 1 receives input signal (load) 2 from a source such as a power supply. Input signal 2 is passed through resistor 3, which is a known type of resistor and may be of a desired resistance to step down the voltage level of input signal 2 to a desired level. Next, input signal 2 is branched to signal 4 which is passed through resistor 5 and split to input signal 9. Also on the path of signal 4 is capacitor 6 for filtering signal 4. The other side of capacitor 6 is grounded. As with resistor 3, resistor 5 and capacitor 6 are known types of components and may be of desired values in different embodiments, without departing from the scope of the invention.

Input signal 9 is joined with feedback signal 42 and passed to input pin 61 of current mode controller unit 60. In this regard, feedback signal 42 and current mode controller unit 60 are discussed in more detail below. Returning to input signal 2, it can be seen that input signal 2 continues past capacitor 8 toward inductor section 11. Capacitor 6 is a known type of capacitor and my have a specific value to provide filtering as desired. Inductor section 11 is the core component of converter 1 for converting voltage from an input voltage level to an output level. As seen in FIG. 1, inductor section 11 has input side including inductor 12 and an output side with inductors 13, 14 and 15. A core is in the middle of inductor section 11, which may be one of many known types of cores, such as iron or air. Accordingly, inductor section 11 acts to convert the voltage level of input signal 2 to an output voltage of output signals 31, 32 and 33. It should be appreciated that the example of inductor section 11 shown in FIG. 1 is an isolating flyback transformer; however, the present invention also works with a simple inductor or with a multiple inductor configuration. As seen in FIG. 1, input signal will only cross inductor 12 of the input side of inductor section 11 when gate 71 is closed by gate drive 70 to provide a closed circuit to resistor 73, which is grounded at the backside. The feedback and control of inductor section 11 incorporate unique features of the present invention and are discussed in more detail below.

Returning to FIG. 1, the output side of inductor section 11 picks up output signals 31, 32 and 33 from inductors 13, 14 and 15. Output signal 31 passes through diode 16, which restricts current flow to the output direction, and also passes by capacitor 20 and diode 25 before final output. Redundant supply input 35 is input to output signal 31 via diode 28 in order to provide hot redundancy in the event of a failure of converter 1 or input signal 2. In a similar fashion, output signal 32 passes through diode 17, which restricts current flow to the output direction, and also passes by capacitors 21 and 22, followed by diode 26 before final output. Redundant supply input 36 is input to output signal 32 via diode 29 in order to provide hot redundancy in the event of a failure of converter 1 or input signal 2. Output signal 33 passes through diode 18, which restricts current flow to the output direction, and also passes by capacitor 23, followed by diode 27 before final output. Redundant supply input 37 is input to output signal 33 via diode 30 in order to provide hot redundancy in the event of a failure of converter 1 or input signal 2. In this manner, converter 1 is provides reliable performance for use in demanding applications that require high reliability, such as in military and other critical applications. Redundant supply inputs 35, 36 and 37 are obtained from a redundant supply (not shown) and allows feedback loop section to provide instant pickup of load in hot redundant system applications, thereby providing glitch-free output voltages.

The present invention is implemented by providing a dual-mode feedback from the output side of inductor section 11, in conjunction with the use of current mode controller 60, to control the operation of inductor section 11 for desired performance under continuous loads or step loads. Feedback loop section 40 is shown in FIG. 1, in which feedback signal 41 is drawn from output signal 33 prior to combination with redundant supply input 37, in order to provide an inductor feedback signal to current mode controller unit 60. In this regard, feedback signal 41 is split off to feedback signal 42 which is passed through diode 53 to control current flow direction and is then joined with input signal 9 and provided to input pin 61 of current mode controller unit 60, as discussed above.

Returning to feedback loop section 40, feedback signal 41 is passed through resistor 45 and then is split to provide source loads 51 and 52 to each of transistors 48 and 54, respectively. Like the other components mentioned above, transistors 48 and 54 are known types of transistors. Feedback signal 42 is split to provide gate signal 43 which is reduced in voltage by resistors 46 and 47 and then provided to transistor 48. When the voltage of gate signal 43 is at the requisite level in accordance with the properties of transistor 48, transistor 48 is "opened" and source load 51 is passed to ground 50 at the drain side of transistor 48, thereby providing a ground to feedback signal 41. In the alternative, when the voltage of gate signal 43 is not at the requisite level in accordance with the properties of transistor 48, transistor 48 is "closed" and source load 51 does not flow through transistor 48.

Similarly, output pin 63 of current mode controller unit 60 provides a reference voltage as gate signal 55 to transistor 54. When the voltage of gate signal 55 is at the requisite level in accordance with the properties of transistor 54, transistor 54 is "opened" and source load 52 is passed to feedback signal 56 at the drain side of transistor 54, thereby providing feedback signal 56 to current sense signal 68. In the alternative, when the voltage of gate signal 55 is not at the requisite level in accordance with the properties of transistor 54, transistor 54 is "closed" and source load 52 does not flow through transistor 54 to feedback signal 56.

Also shown in feedback loop section 40 of FIG. 1 is comparator unit 57, which is disposed above current mode controller unit 60. It should be appreciated that comparator unit 57 is not essential for operation of the present invention, but is included in the example shown in FIG. 1 to act as an over-voltage protection circuit in case the main feedback loop, section 40, fails. Comparator unit 57 receives feedback signal 56 when transistor 54 is open, and compares feedback signal 56 to reference voltage signal 58, which in this case is ground, via zener diode 7, acting as an over-voltage regulator. When feedback signal 56 is different than reference voltage signal 58, comparator output signal 59 is output to gate drive 70. In the alternative, when feedback signal 56 is the same as reference voltage signal 58, comparator output signal 59 is not output to gate drive 70.

Turning to gate drive 70, it can be seen that current mode controller unit 60 outputs output control signal 67 to gate drive 70. Accordingly, when comparator output signal 59 or output control signal 67 are greater than a predetermined value (typically zero) according to the characteristics of gate drive 70, gate drive 70 operates to close gate 71, thereby closing the circuit for the input side of inductor section 11 to result in the generation of output signals 31 to 33. Current mode controller unit 60 is a typical, standardized type of current controller and, in the example shown in FIG. 1, is an SG 1845 standard controller, with known logic parameters. It should be appreciated that other types of controllers can be used equally well in the present invention, and that an equivalent control section can also be used which is comprised of discrete components to replicate the controller's functionality. As seen in FIG. 1, current mode controller unit 60 receives input signal 9 at input pin 61, after input signal 9 has been joined feedback signal 42. This signal acts as the sleep start for current mode controller unit 60. The other connections of current mode controller unit 60 include input pin 62 which is grounded, output pin 63 which outputs gate signal 55 to transistor 54, output pin 64 which is grounded, input pin 65 which inputs current sense signal 68, and output pin 66 which outputs output control signal 67 to gate drive 70. Current sense signal 68 detects whether current is flowing across the input side of inductor section 11, such as when gate drive 70 closes gate 70. Based on these inputs, and the standardized logic of current mode controller unit 60, current mode controller unit 60 controls whether or not output control signal 67 operates gate drive 70 to close or open gate 71, thereby controlling operation of inductor section 11.

In this manner, feedback loop section 40, which technically includes comparator unit 57, is configurable to operate as a linear feedback loop when a continuous load is applied at input signal 2, or to operate as a comparator feedback loop when a non-continuous step load is applied at input signal 2. Transistors 48 and 54 operate to configure feedback loop section 40 by acting as a high-speed differential pair. As can be appreciated from viewing FIG. 1, when input signal 2 is a continuous voltage value, transistor 48 is in an open state and transistor 54 is in a closed state, thereby configuring feedback loop section 40 to operate in a linear feedback mode by disconnecting feedback signal 41 from feedback signal 56 so as to prevent feedback signal 41 from reaching current sense signal 68 and from reaching comparator unit 57. In this mode, comparator unit 57 is disabled from outputting comparator output signal 59 to gate drive 70. In the linear feedback mode, converter 1 operates with high performance and provides constant duty control, while giving a small signal response, and in one embodiment may operate at a bandwidth below 10 kHz.

In the alternative, when input signal 2 is a non-continuous step voltage load, transistor 48 is in a closed state and transistor 54 is in an open state, thereby configuring feedback loop section 40 to operate in a comparator feedback mode by connecting feedback signal 41 to feedback signal 56 which is joined to current sense signal 68, and which is provided to comparator unit 57, thereby enabling comparator unit 57 to output comparator output signal 59 to gate drive 70. In the comparator feedback mode, converter 1 operates with high performance and instantly responds to the step load with negligible undershoot or overshoot of the output voltage at the output side of inductor section 11.

According to the above, the converter provides dual-mode high-performance capability. In one embodiment, the operational frequency range of the converter is 50 kHz to 200 kHz, and the operating power range for the output signals is 1.1 to 8.9 Watts. Of course, it can be appreciated that other embodiments of the present invention can operate in a frequency range that is only limited by the state of the art, and in a power range of up to 1000 Watts or more. Also, the capacitors in the output side of inductor section, such as capacitors 20 to 23, are made of tantalum and ceramic materials for providing output filtering under high temperature operation.

Figure 2:
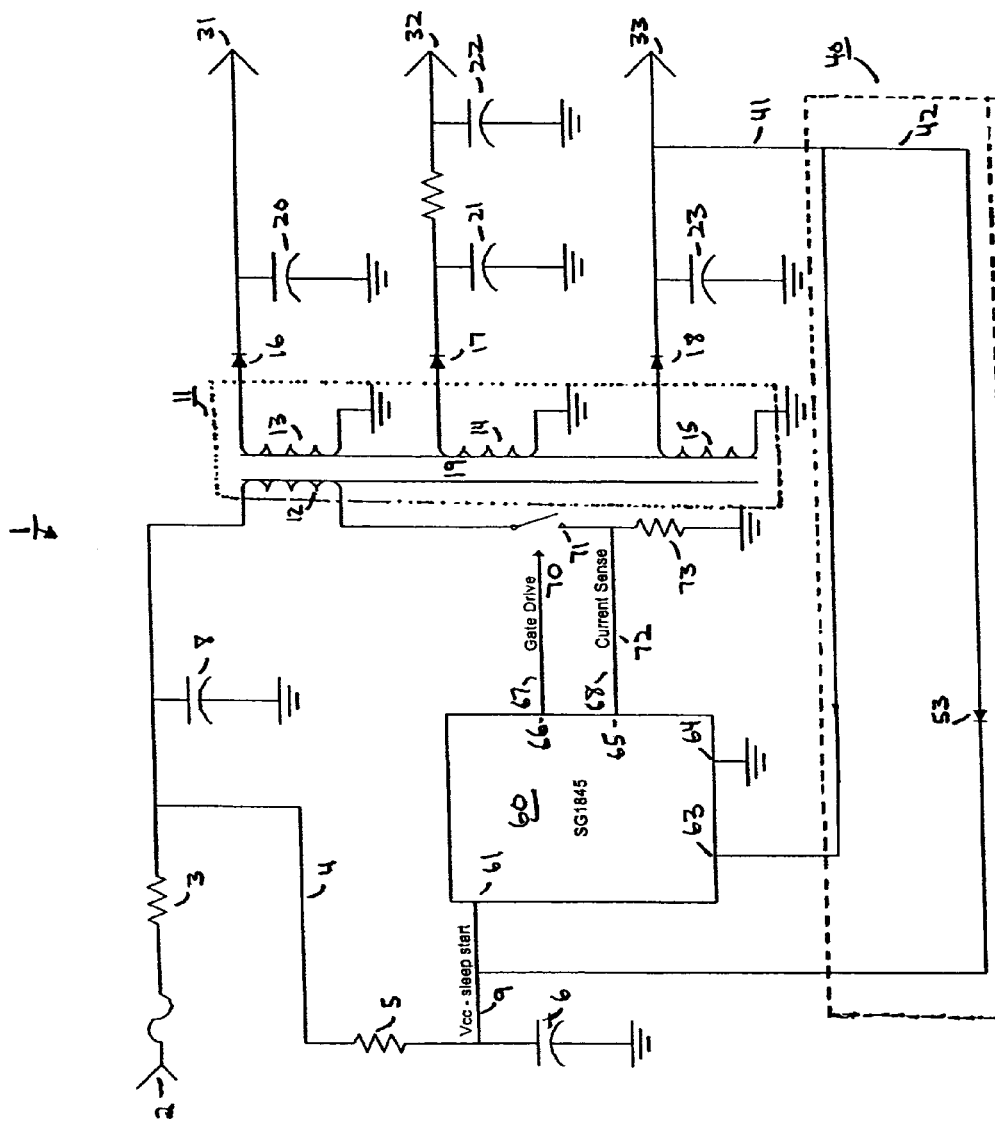
FIG. 2 shows a schematic for the converter of FIG. 1 in another configuration.

FIG. 2 shows an example of converter 1 when re-configured by the differential pair of transistors 48 and 54. The components of converter 1 shown in FIG. 2 are substantially similar as those shown in FIG. 1 and are not described again here for the sake of brevity. The differential amp, comprised of transistors 48 and 54, controls the configuration between the linear and the comparative modes. When converter 1 is in the linear mode, both transistors 48 and 54 are in a conducting state, and when converter 1 is in the comparative mode, either one of transistors 48 and 54, but not both, is in a conducting state. In the linear mode, converter 1 generates continuous duty waveforms, and in the comparative mode, the duty cycle can instantaneously jump to zero or to maximum duty cycle in response to a step transient of the input load. Once the step transient has passed, converter 1 automatically reverts to the linear mode configuration, which is not represented by FIG. 2. In this manner, the quick mode changes of converter 1 between linear and comparative modes allows converter 1 to instantly respond to transients, when necessary.

Figure 3:
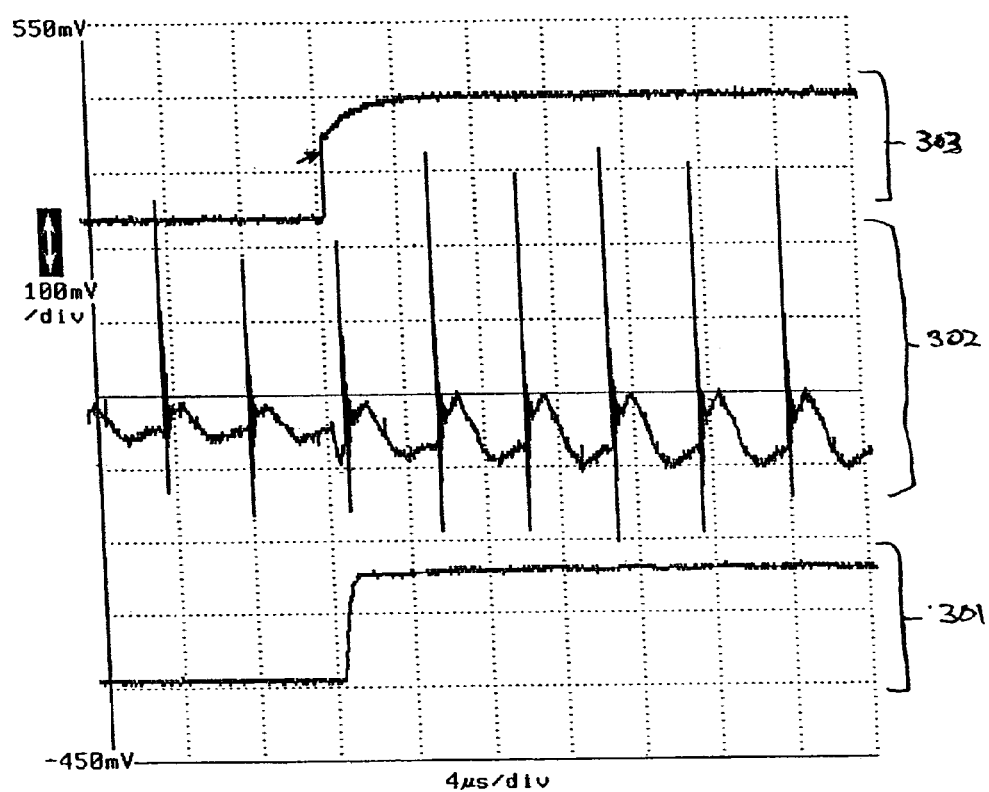
FIG. 3 is a chart depicting the performance of the converter shown in FIG. 1 according to one embodiment of the present invention.

As an example of the performance of converter 1, FIG. 3 shows the performance according to one simulated embodiment. As seen in FIG. 3, signal 301 represents the input load applied to converter 1, which shows a step transient. Signal 302 represents the output signal in response to the input load of signal 301. As seen in FIG. 3, the magnitude of output signal 302 adjusts quickly to the step in input signal 301 without significant overshoot or undershoot of output voltage. During the continuous sections of input signal 301, output signal 302 responds with constant duty control. Signal 303 represents the current load corresponding to the input load of signal 301. Upon review of output signal 302, it can be seen that the dual-mode converter of the present invention handles the step transient of the input load without significant overshoot or undershoot in the output signal.

In this manner, the present invention provides a converter that uses a dual-mode feedback loop that operates with high performance in a linear mode during continuous input loads and in a comparative mode during a step input load, with inherent stability. Accordingly, the converter of the present invention provides increased performance without the need for feedback loop compensation or other additional classical feedback components. The components of the converter are readily available and provides for a converter of high reliability and durability because the feedback components are discrete. The converter acts like a comparator when step loads are applied and instantly responds to the step demand with negligible undershoot or overshoot of output voltage. Similarly, the converter acts in a linear mode when a continuous load is applied and provides constant duty control.

The invention has been described with respect to particular illustrative embodiments. It is to be understood that the invention is not limited to the above-described embodiments and that various changes and modifications may be made by those of ordinary skill in the art without departing from the spirit and scope of the invention described herein. For example, the invention is not limited to using the specific types of components described above, such as the isolating flyback converter, and other components with other characteristics can be used in other embodiments of the present invention equally well.

What is claimed is:

1. A dual-mode converter for converting power from an input voltage level to an output voltage level, the dual-mode converter comprising:
   an inductor section having an input side and an output side, the input side receiving an input signal and the output side outputting at least one output signal based on the input voltage level of the input signal;
   a feedback loop section which receives a feedback signal from one or more of the at least one output signals, the feedback loop section including a first transistor, a second transistor and a comparator unit which outputs a comparator output signal based on a comparison of the feedback signal to a comparator reference signal, wherein the respective states of the first and second transistors configure the feedback loop section to function in one of a linear mode and a comparator mode;
   a current mode controller unit which receives the input signal, the feedback signal, and a current sense signal representing a sensed current flowing through the input side of the inductor section, the current mode controller unit outputting an output control signal based on the received input signal, the feedback signal, and the current sense signal; and
   a control gate that enables the current flow through the input side of the inductor section when the output control signal or the comparator output signal is greater than a predetermined threshold.

2. The converter of claim 1, wherein the input side of the inductor section includes a single inductor and the output side includes a plurality of inductors each of which outputs a corresponding output signal, the input side being separated from the output side by an iron core.

3. The converter of claim 2, wherein the output side of the inductor section includes three inductors, and each output signal from each inductor in the output side is filtered by at least one capacitor.

4. The converter of claim 1, wherein the feedback signal is obtained from the at least one output signal input from the output side of the inductor section.

5. The converter of claim 1, wherein the control gate is an OR gate.

6. The converter of claim 2, wherein the feedback signal is a redundant feedback signal that is obtained from the plurality of output signals from the output side of the inductor section, and wherein the comparator unit is an overvoltage feedback comparator which outputs the comparator output signal having a non-zero voltage value if the redundant feedback signal is different than the comparator reference signal.

7. The converter of claim 1, wherein a redundant supply input signal is combined with each of the at least one output signals from the output side of the inductor section, and the feedback signal is obtained from the at least one output signals combined with the redundant supply input signal.

8. The converter of claim 1, wherein, when the input signal has a continuous voltage value, the first transistor is in an open state and the second transistor is in a closed state, thereby configuring the feedback loop section to operate in a linear mode by disconnecting the feedback signal from the current sense signal, and by disconnecting the feedback signal from the comparator unit so that the comparator unit does not output the comparator output signal.

9. The converter of claim 1, wherein, when the input signal represents a step load having a non-continuous voltage value, the first transistor is in a closed state and the second transistor is in an open state, thereby configuring the feedback loop section to operate in a comparative mode by connecting the feedback signal with the current sense signal that is input to the current controller unit, and by connecting the feedback signal to the comparator unit, enabling the comparator unit to output the comparator output signal.

10. The converter of claim 1, wherein the current mode controller unit is a standardized controller unit which operates in accordance with a standardized predetermined logic set based on the properties of the received input signal, feedback signal, and current sense signal.

11. The converter of claim 1, wherein an operational frequency range of the converter is 50 kHz to 200 kHz.

12. The converter of claim 3, wherein each capacitor is comprised of at least tantalum and a ceramic material.

13. The converter of claim 1, wherein an operating power range for the at least one output signal is 1.1 to 8.9 Watts.

* * * * *